(12) United States Patent
Rotithor et al.

(10) Patent No.: US 10,911,345 B2
(45) Date of Patent: Feb. 2, 2021

(54) SYSTEM AND METHOD FOR LINK BASED COMPUTING SYSTEM HAVING AUTOMATICALLY ADJUSTABLE BANDWIDTH AND CORRESPONDING POWER CONSUMPTION

(71) Applicant: Intel Corporation, Santa Clara, CA (US)

(72) Inventors: Hemant G. Rotithor, Hillsboro, OR (US); An-Chow Lai, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 16/119,689

(22) Filed: Aug. 31, 2018

(65) Prior Publication Data

US 2019/0190810 A1 Jun. 20, 2019

Related U.S. Application Data

(63) Continuation of application No. 11/479,386, filed on Jun. 30, 2006, now Pat. No. 10,069,711.

(51) Int. Cl.
*H04L 12/26* (2006.01)
*H04L 12/24* (2006.01)

(52) U.S. Cl.
CPC .......... *H04L 43/16* (2013.01); *H04L 41/0896* (2013.01); *H04L 43/0882* (2013.01)

(58) Field of Classification Search
CPC .. H04L 41/0896; H04L 43/0882; H04L 43/16
See application file for complete search history.

(56) References Cited

U.S. PATENT DOCUMENTS

| 6,009,488 | A | 12/1999 | Kavipurapu | |
|---|---|---|---|---|
| 6,986,069 | B2 | 1/2006 | Oehler et al. | |
| 7,313,712 | B2* | 12/2007 | Cherukuri | G06F 1/3209 713/324 |
| 7,418,517 | B2 | 8/2008 | Zeitler et al. | |
| 7,447,824 | B2 | 11/2008 | Jabori et al. | |
| 2005/0097378 | A1 | 5/2005 | Hwang | |
| 2006/0129733 | A1 | 6/2006 | Sobelman | |
| 2006/0265612 | A1* | 11/2006 | Tseng | G06F 13/385 713/300 |
| 2007/0067548 | A1* | 3/2007 | Juenger | G06F 13/40 710/315 |
| 2007/0150762 | A1 | 6/2007 | Sharma et al. | |
| 2007/0234080 | A1 | 10/2007 | Mackey et al. | |
| 2008/0005647 | A1* | 1/2008 | Bains | G06F 11/1004 714/781 |

* cited by examiner

*Primary Examiner* — Terrell S Johnson
(74) *Attorney, Agent, or Firm* — Alliance IP, LLC (57) ABSTRACT

A method is described that involves determining that utilization of a logical link has reached a first threshold. The logical link comprises a first number of active physical links. The method also involves inactivating one or more of the physical links to produce a second number of active physical links. The second number is less than the first number. The method also involves determining that the second number of active physical links have not been utilized for a period of time and inactivating another set of links.

26 Claims, 5 Drawing Sheets

SYSTEM AND METHOD FOR LINK BASED COMPUTING SYSTEM HAVING AUTOMATICALLY ADJUSTABLE BANDWIDTH AND CORRESPONDING POWER CONSUMPTION

CROSS-REFERENCE TO RELATED APPLICATIONS

This application is a continuation of U.S. patent application Ser. No. 11/479,386, filed on Jun. 30, 2006, the entire contents of which are hereby incorporated by reference herein.

FIELD OF INVENTION

The field of invention relates to the computer sciences, generally, and, more specifically, to port circuitry for a link based computing system having automatically adjustable bandwidth and corresponding power consumption.

BACKGROUND

Computing systems have traditionally been designed with a "front-side bus" between their processors and memory controller(s). High end computing systems typically include more than one processor so as to effectively increase the processing power of the computing system as a whole. Unfortunately, in computing systems where a single front-side bus connects multiple processors and a memory controller together, if two components that are connected to the bus transfer data/instructions between one another, then, all the other components that are connected to the bus must be "quiet" so as to not interfere with the transfer.

For instance, if four processors and a memory controller are connected to the same front-side bus, and, if a first processor transfers data or instructions to a second processor on the bus, then, the other two processors and the memory controller are forbidden from engaging in any kind of transfer on the bus. Bus structures also tend to have high capacitive loading which limits the maximum speed at which such transfers can be made. For these reasons, a front-side bus tends to act as a bottleneck within various computing systems and in multi-processor computing systems in particular.

Figure 1:
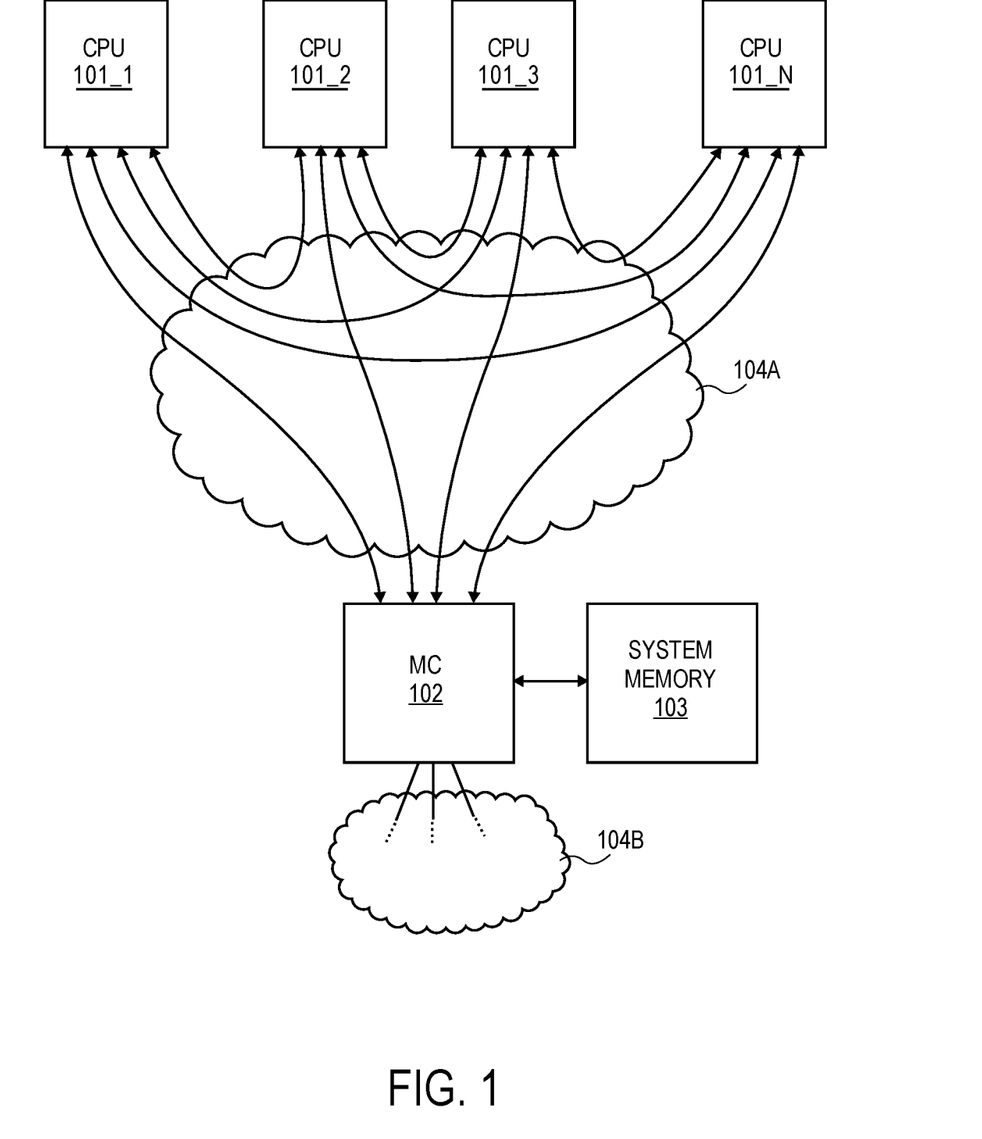
FIG. 1 (prior art) shows a computing system with a network that couples a processor to a memory controller.

In recent years computing system designers have begun to embrace the notion of replacing the front-side bus with a network. FIG. 1 shows an approach where the front-side bus is essentially replaced with a network 104a having point-to-point links between each one of processors 101_1 through 101_N and memory controller 102. The presence of the network 104a permits simultaneous data/instruction exchanges between different pairs of communicating components that are coupled to the network 104a. For example, processor 101_1 and memory controller 102 could be involved in a data/instruction transfer during the same time period in which processor 101_3 and processor 101_4 are involved in a data/instruction transfer. While providing a performance advantage, point-to-point link based systems typically are less power efficient than front-side bus systems.

Computing systems that embrace a network in lieu of a front-side bus may extend the network to include other regions of the computing system 104b such as one or more point-to-point links between the memory controller 102 and any of the computing system's I/O devices (e.g., network interface, hard-disk file, etc.).

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 2:
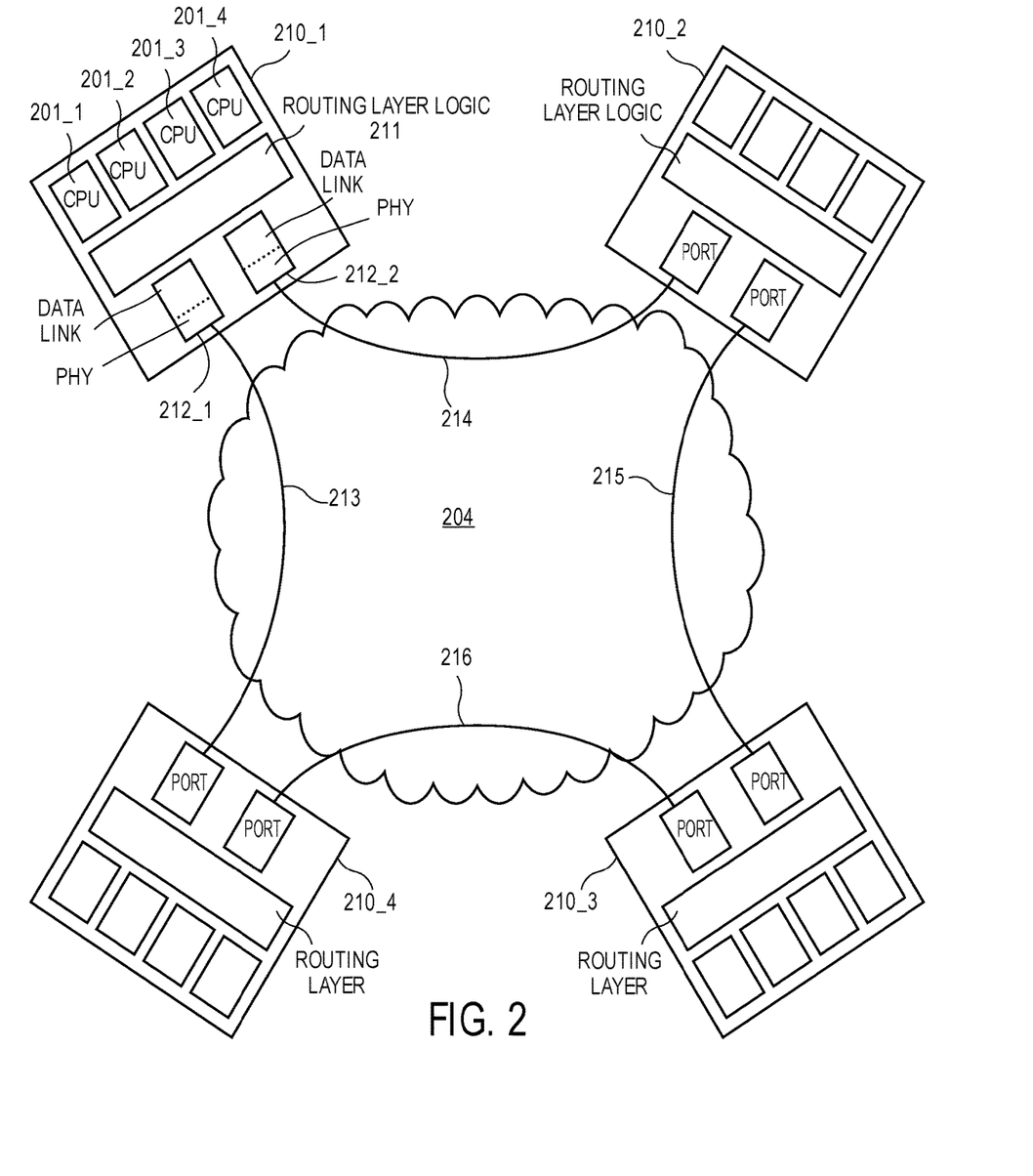
FIG. 2 shows a computing system having sockets interconnected by a network.

FIG. 2 shows a more detailed depiction of a multi-processor computing system that embraces the placement of a network, rather than a bus, between components within the computing system. The components 210_1 through 210_4 that are coupled to the network 204 are referred to as "sockets" because they can be viewed as being plugged into the computing system's network 204. One of these sockets, socket 210_1, is depicted in detail.

According to the depiction observed in FIG. 2, socket 210_1 is coupled to network 204 through two bi-directional point-to-point links 213, 214. In an implementation, each bi-directional point-to-point link is made from a pair of uni-directional point-to-point links that transmit information in opposite directions. For instance, bi-directional point-to-point link 214 is made of a first uni-directional point-to-point link (e.g., a copper transmission line) whose direction of information flow is from socket 210_1 to socket 210_2 and a second uni-directional point-to-point link whose direction of information flow is from socket 210_2 to socket 210_1.

Because two bi-directional links 213, 214 are coupled to socket 210_1, socket 210_1 includes two separate regions of data link layer and physical layer circuitry 212_1, 212_2. That is, circuitry region 212_1 corresponds to a region of data link layer and physical layer circuitry that services bi-directional link 213; and, circuitry region 212_2 corresponds to a region of data link layer and physical layer circuitry that services bi-directional link 214. As is understood in the art, the physical layer of a network typically forms parallel-to-serial conversion, encoding and transmission functions in the outbound direction and, reception, decoding and serial-to-parallel conversion in the inbound direction.

That data link layer of a network is typically used to ensure the integrity of information being transmitted between points over a point-to-point link (e.g., with CRC code generation on the transmit side and CRC code checking on the receive side). Data link layer circuitry typically includes logic circuitry while physical layer circuitry may include a mixture of digital and mixed-signal (and/or analog) circuitry. Note that the combination of data-link layer and physical layer circuitry may be referred to as a "port" or Media Access Control (MAC) layer. Thus circuitry region 212_1 may be referred to as a first port or MAC layer region and circuitry region 212_2 may be referred to as a second port or MAC layer circuitry region.

Socket 210_1 also includes a region of routing layer circuitry 211. The routing layer of a network is typically responsible for forwarding an inbound packet toward its proper destination amongst a plurality of possible direction choices. For example, if socket 210_2 transmits a packet along link 214 that is destined for socket 210_4, the routing layer 211 of socket 210_1 will receive the packet from port 212_2 and determine that the packet should be forwarded to port 212_1 as an outbound packet (so that it can be transmitted to socket 210_4 along link 213).

By contrast, if socket 210_2 transmits a packet along link 214 that is destined for processor 201_1 within socket 210_1, the routing layer 211 of socket 210_1 will receive the packet from port 212_2 and determine that the packet should be forwarded to processor 201_1. Typically, the routing layer undertakes some analysis of header information within an inbound packet (e.g., destination node ID, connection ID) to "look up" which direction the packet should be forwarded. Routing layer circuitry 211 is typically implemented with logic circuitry and memory circuitry (the memory circuitry being used to implement a "look up table").

The particular socket 210_1 depicted in detail in FIG. 2 contains four processors 201_1 through 201_4. Here, the term processor, processing core and the like may be construed to mean logic circuitry designed to execute program code instructions. Each processor may be integrated on the same semiconductor chip with other processor(s) and/or other circuitry regions (e.g., the routing layer circuitry region and/or one or more port circuitry region). It should be understood that more than two ports/bi-directional links may be instantiated per socket. Also, the computing system components within a socket that are "serviced by" the socket's underlying routing and MAC layer(s) may include a component other than a processor such as a memory controller or I/O hub.

A problem in link based computing systems involves the power consumption of the port circuitry. Specifically, because portions of the port circuitry may be designed to operate at some of the highest frequencies used by the entire system, the port circuitry may also possess some of the highest power consumption densities within the entire system. High energy consumption becomes particularly wasteful when the port circuitry's corresponding links are not being used at their maximum capacity. That is, the port circuitry may be consuming energy at its maximum power rate while the data flowing through the port circuitry is less than its maximum data rate.

Figure 3:
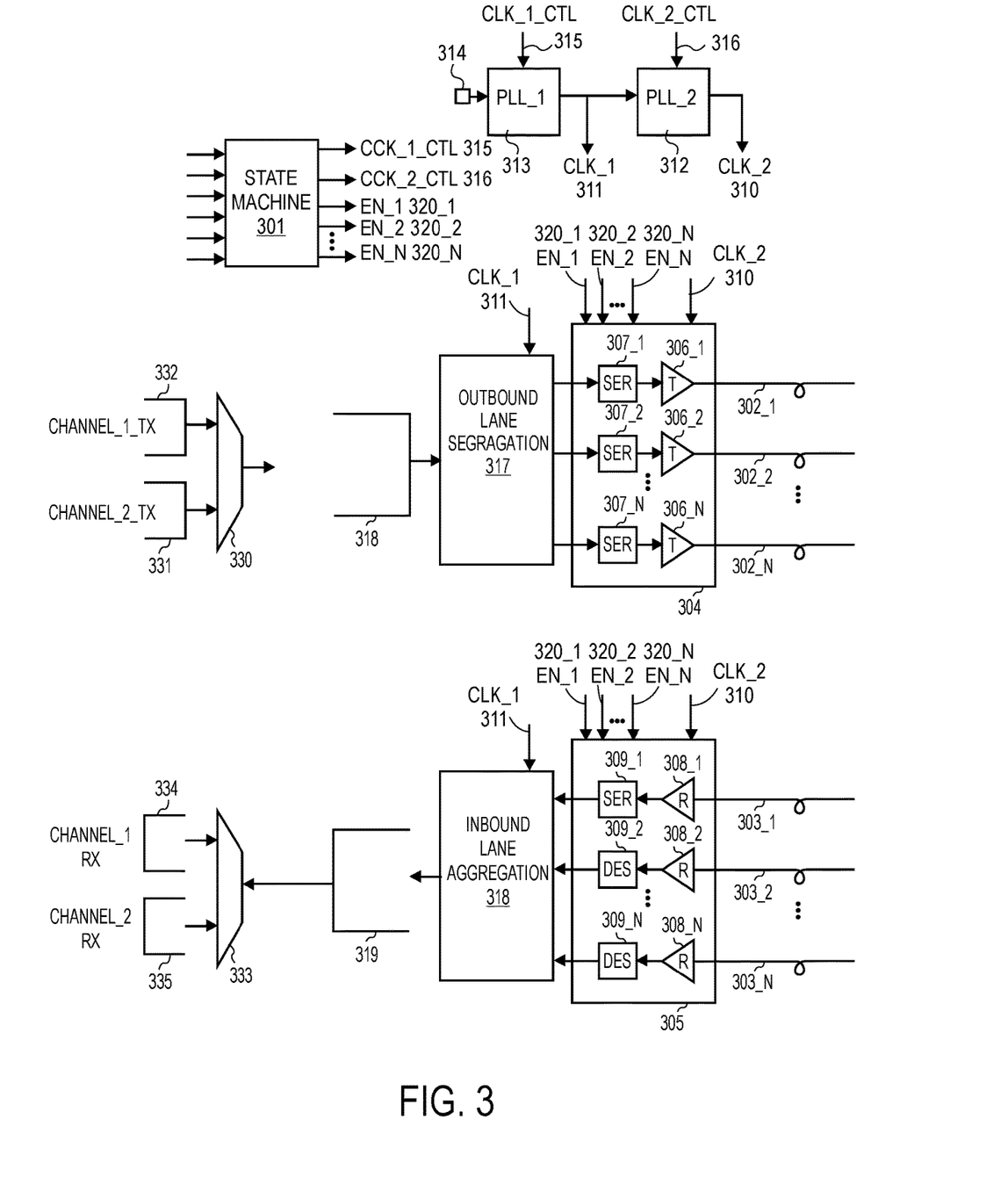
FIG. 3 shows an embodiment of port circuitry.
Figure 4A:
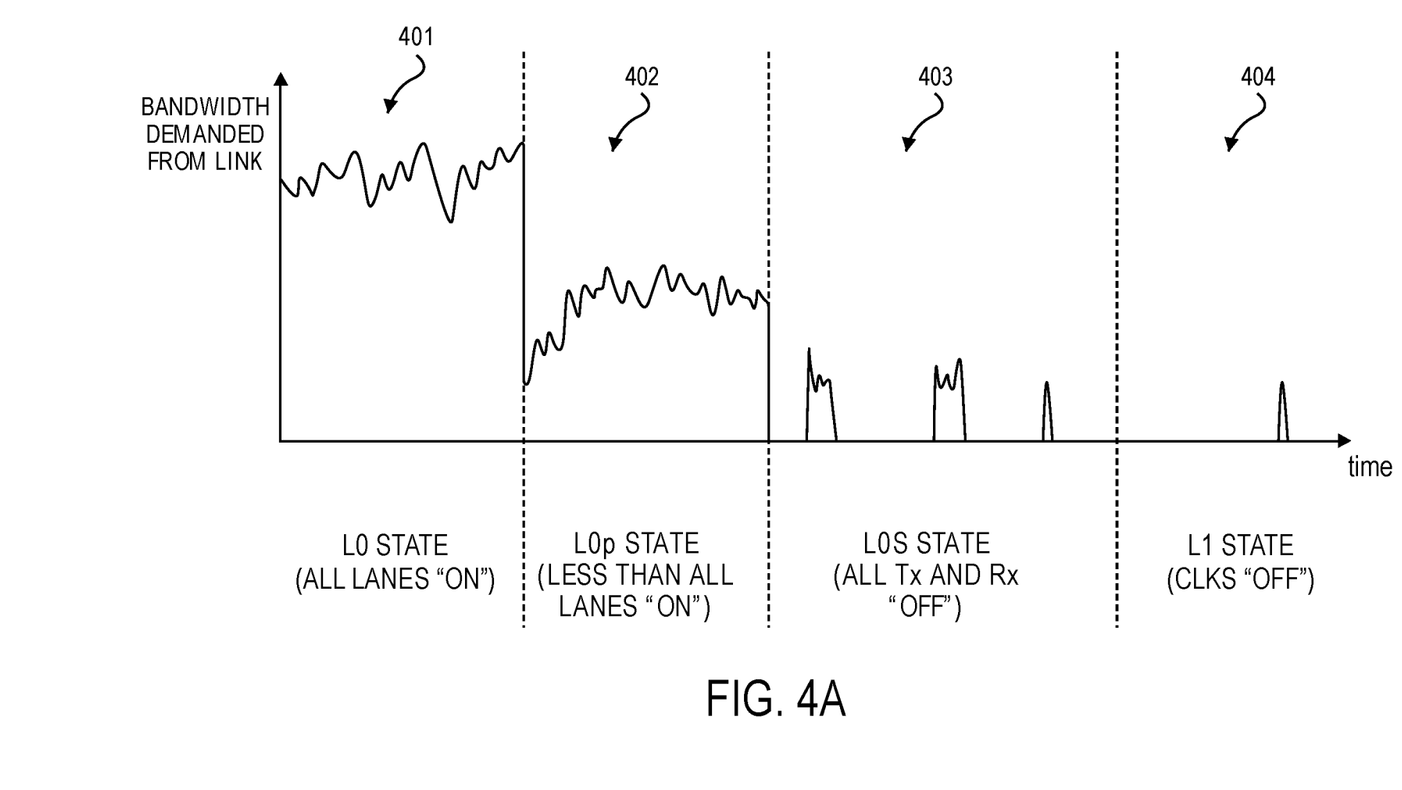
FIG. 4a shows various link bandwidths that the port circuitry of FIG. 3 may need.
Figure 4B:
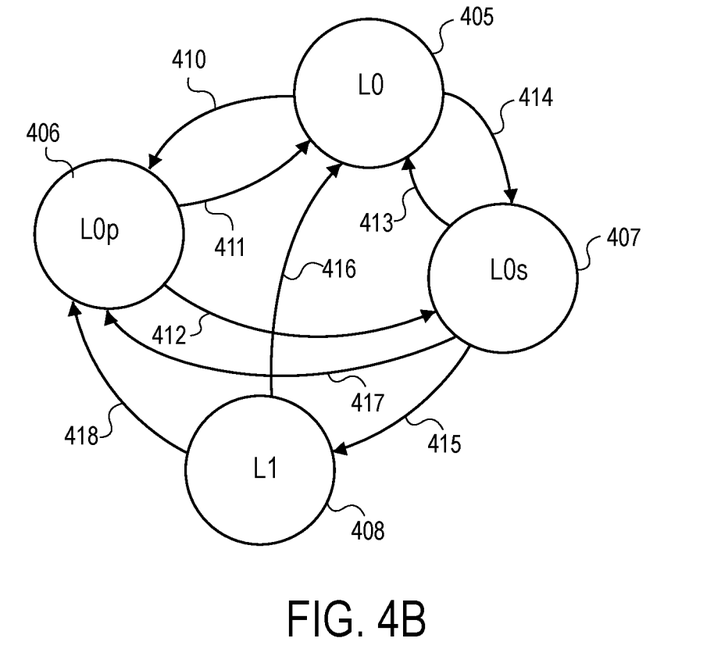
FIG. 4b pertains to different states of operation that the port circuitry of FIG. 3 is capable of effecting in light of various link bandwidth needs.

FIGS. 3 and 4 outline an embodiment of port circuitry designed to modulate its power consumption consistently with the amount of data that is presently flowing through it. A circuitry diagram is shown in FIG. 3, and, a bandwidth demand curve and state machine diagram are shown in FIGS. 4a and 4b, respectively. According to the circuit diagram of FIG. 3, a single "logical" uni-directional link is actually constructed from a plurality of "physical" uni-directional links, where, the total bandwidth of the logical uni-directional link is viewed as the combined bandwidth of the physical uni-directional links. For instance, if there are eight 1.25 Gb/s physical uni-directional links connecting nodes A and B within the computing system's network, then, a 10.0 Gb/s logical link is viewed as connecting nodes A and B within the computing system's network. Each physical link may also be referred to as a "lane."

Accordingly, FIG. 3 shows a generic architecture for a single logical link having N lanes 302_1 through 302_N in the transmit direction and N lanes 303_1 through 303_N in the receive direction. In the transmit direction, each lane is driven by a respective transmitter 306_1 through 306_N, and, each respective transmitter is preceded by a respective serializer 307_1 which converts a parallel "word" of data (e.g., a 10 bit wide word of data, a 16 bide word of data, etc.) into a serial bit stream. A shift register may be used as a serializer. A respective encoder for encoding the serialized bit stream (e.g., such as an 8b/10b encoder for minimizing data corruption errors during transmission) may be associated with each serializer. Each transmitter may be a "driver" circuit that drives electrical signals over its respective link (in which case each link may correspond to an electrically conductive transmission line (such as a 50 ohm or 75 ohm copper cable)), or, each transmitter may be an optical device such as a LED or LASER (in which case each link may correspond to a fiber optic cable).

Each logical link is presumed to be divided into a number of logical "channels" used by the higher layers of the computing system. For simplicity, the circuitry of FIG. 3 only shows two channels "Channel_1" and "Channel_2." Data to be transported over channel 1 is entered into queue 332. Data to be transported over channel 2 is entered into queue 331. A multiplexer 330 is used to control which channel is presently given use of the logical link. The output of multiplexer 330 feeds a queue 318 that packs words of data for transmission provided by either of queues 331 or 332. Multiplexer 330 may also serve as a clock domain cross-over point as data entered into queues 331 or 332 may be timed according to a clock source having a different fundamental frequency than the clock source used to time the operation of the serializers 307 and drivers 306. Outbound lane segregation circuitry 317 is a circuit that divides the data queued into streams of words for each lane, and, presents these streams to their respective serializer.

The inbound direction circuitry essentially operates in reverse order of the transmit direction circuitry. Respective electrical or optical receivers 308_1 through 308_N receive serial data for each lane. Deserializers 309_1 through 309_N convert the inbound serial bit streams into parallel words for each lane. An inbound lane aggregation circuit 318 packs the smaller words from the deserializers into larger words. These words may cross a clock domain boundary through queue 319. From queue 319 outbound words are steered into one of channel queues 334, 335. Other pertinent parts of the circuitry of FIG. 3 will be described in more detail further below.

FIG. 4a demonstrates different combined inbound and outbound traffic intensities 401 through 404 that the port circuitry of FIG. 3 may be asked to handle. FIG. 4a also relates the specific traffic intensities to a specific state depicted in the state diagram of FIG. 4b. Each state 405 through 408 in the state diagram corresponds to a specific mode of operation of the port circuit of FIG. 3. Thus, the port circuitry of FIG. 3 has different operational modes, where, each mode is specially tailored for a specific traffic intensity. The port circuitry of FIG. 3 includes a state machine 301 that: 1) detects the current traffic intensity environment that the port circuitry is being asked to handle; and, 2) places (or keeps) the port circuitry in a specific mode of operation that is appropriate for the detected traffic intensity.

Essentially, the spectrum of different traffic intensities that the port circuitry may be asked to handle are divided into multiple groups (e.g., the four groups depicted in FIG. 4a: heavy 401, moderate 402, sporadic 403 and light 404). Before describing the details of the state diagram, it may be helpful to understand more fully the nature of the traffic patterns that the port circuitry is apt to handle. Assuming the port circuitry is for a socket containing processing cores that communicate to a remote memory controller through the logical link, the outbound traffic intensity tends to be sporadic or light in nature (e.g., akin to traffic intensity 403 or 404) because the CPU primarily asks the memory controller for data with a simple request (however in cases of high system performance demands even the request flow in the outbound direction can be heavy 401 or moderate 402). Outbound traffic may consist data packets for writing to memory. The number of writes tends to be much smaller (for example, on-third to one-fourth) than the number of read requests to memory in a number of workloads which keeps the traffic on outbound link sporadic.

By contrast, in the inbound direction, the requested data is actually being received. A single request for data is typically responded to with multiple bytes of data (e.g., "a cache line's worth" of data such as 32 bytes, 64 bytes, etc.). Hence, the traffic intensity in the inbound direction, depending on the frequency at which the processing core(s) are asking for data through the transmit side, can vary any where between heavy 401 to light 404. Accordingly, inbound traffic is burst-like in nature.

In the case of a logical link that connects two processing cores, the traffic flows are somewhat different than that described just above because the processing cores can snoop each other's caches. That is, referring to FIG. 3, a stream of requests for data can be received in the inbound direction (from the processing core to which the port circuit of FIG. 3 is talking to) and a flow of data sent in response to these requests can flow out in the outbound direction.

According to one embodiment, the state machine 301 only concerns itself with the outbound circuitry regardless of where the port circuit is located in the system. In this case, only transmitters are turned on and off, so, the port circuitry essentially modulates the bandwidth in the outbound direction irregardless of the amount of traffic that is being received on its inbound side. Here, the state machine will receive some form of input signal from the outbound circuitry (such as a signal from circuitry associated with queue 318 that determines the state of the queue (i.e., how many entries are queued in the queue) and/or analyzes each request in the queue (e.g., to determine how much data is being asked for). Also, note that the port logic on the other side of the logical link will control the logical link bandwidth in the inbound direction.

In alternate embodiments, control packets may be sent between connected port circuits (i.e., port circuits that communicate to one another over the same logical link) so that both sides of a logical link are in the same state. For instance, according to one approach, referring to FIG. 3, if state machine 301 decides that the link needs to enter a specific state, a control packet is created and entered into outbound queue 318. The packet is sent over the link in the outbound link direction and interpreted on the other side of the link which causes the port circuit on the other side of the link to enter the same state the state machine 301 just decided to enter.

According to one such approach, in the case of a logical link between a processing core and a memory controller, the state machine on the processing core side is the "master" and simply tells the memory controller side what state is the correct state. In this case, the state machine on the processing core side can determine the proper bandwidth and power consumption of the link simply by monitoring the requests for data flowing out in the outbound direction. In this case, the state machine will receive some form of input signal from the outbound circuitry (such as a signal from circuitry associated with queue 318) that determines the state of the queue (i.e., how many entries are queued in the queue) and/or analyzes each request in the queue (e.g., to determine how much data is being asked for).

Even additional alternate embodiments exist (such as a memory controller side master that measures the requests on in its inbound side and/or the amount of data being sent on its outbound side). In the case of a logical link between two processing cores, again, one end of the link may act as the master, however, requests should be monitored in both the inbound and outbound directions so that the amount of requested data flowing through link can be measured in both directions. As such, the state machine should receive input signals from both the inbound and outbound circuitry (such as signals generated by circuitry associated with queue 318 and circuitry associated with queue 319).

According to FIGS. 4a and 4b, when the traffic intensity is heavy 404, the port circuitry state machine 301 adjusts itself to be in the L0 state 405. In the L0 state, all lanes are active (i.e., no lanes are turned off). In this case, the port circuitry has enabled the logical link for full bandwidth with corresponding full power consumption. When traffic intensity is moderate 404, the port circuitry state machine 301 adjusts itself to be in the L0p or "L0 partial" state. In the L0p state, some of the lanes are turned "off" in both the inbound and outbound direction. As such, the logical link has less than full bandwidth, but, is also consuming less than full power as well.

For instance, according to one approach, N=8 and entry into the L0p state from the L0 state turns 4 lanes off (leaving four lanes on). Thus, the logical link is reduced to half bandwidth in the L0p state. In further embodiments there may also exist multiple sub-states of the L0p state to further granularize the bandwidth and/or power consumption adjustments that can be made. For instance, the L0p state could be divided into two sub-states, one that operates at half speed (e.g., four lanes are on for an N=8 system) and another that operates at a quarter speed (e.g., two lanes are on for an N=8 system).

When traffic intensity is sporadic 403, the port circuitry state machine adjusts itself to be in the L0s state in which all lanes are turned off. Referring to FIG. 3, according to one embodiment, the manner in which lanes are turned off in the L0p and L0s states is of importance. Specifically, the transmitters of the respective lanes are turned "off" and the phase locked loop (PLL) and/or delay locked loop (DLL) circuits 312, 313 that source the clock signal(s) 310 used by the transmitters 306_1 through 306_N are left "on" (i.e., continue to operate). This, in turn, requires those transmitters that are turned off to be turned off according to some technique other than turning off the circuitry that generates their input clock signal. For instance, supply power could be removed (requiring some form of switch between each transmitter and/or receiver's input power node) or the input clock and/or input signals to the transmitter and/or receiver could be squelched (requiring a logic gate or some other circuit capable of voiding a thru signal to be placed in series with a clock signal line or in the signal channel flowing through the transmitter and/or receiver).

For simplicity, FIG. 3 only shows individual "enable" lines 320_1 through 320_N to achieve the turning off of the respective transmitters 306_1 through 306_N (e.g., enable line 320_1 turns off transmitter 306_1; enable line 320_2 turns off transmitter 306_2; etc.). It should be understood that enable lines 320_1 through 320_N can couple to any circuit that turns their respective transmitters off. Similarly, enable lines 320_1 through 320_N individually turn off receivers 308_1 through 308_N, respectively. Of course, a separate enable line for each transmitter and receiver may be used.

A motivation for leaving the phase locked loop (PLL) and/or delay locked loop (DLL) circuits 312, 313 "on" is that the bring-up delay associated with the bringing up of these circuits back to full operation is avoided should the port circuit transition from the L0s state to a state in which bandwidth is needed. Here, phase locked loop and delay locked loop circuits are understood to require a "synch time" after they are first turned on before they reach their proper steady state frequency. By leaving these circuits 312, 313 "on" in the L0s state, if the port circuit transitions back to a state in which working bandwidth is required, the port circuit need not wait for the synch time before traffic can begin to be transmitted over the logical link.

When traffic intensity is light 403, the port circuitry state machine adjusts itself to be in the L1 state in which not only are all lanes are turned off but also the clock generation circuits 312, 313 are turned off via clock control lines 315, 316. In this state, the traffic intensity is so small that the power savings benefit from turning off the clock generation circuit outweighs the penalty of having to endure the synch time delay when bringing up the port circuit out of the L1 state.

In a credit based flow control system, a port circuit can only send data if it has sufficient credits. Here, each time a packet is sent out, the credit count on the sending side is decremented. The credit(s) is/are effectively returned to the sending side by the receiving side only after the receiving side successfully receives the sent packet. Each credit typically represents an amount of data that is permitted to be sent over the link. In a design approach where the state machine 301 only concerns itself with modulating the bandwidth in the outbound direction, a problem may arise in the L0s and L1 states if the logical link imposes flow control through the use of credits. Specifically, because all outbound lanes are turned off in the L0s and L1 states, credits can not be returned to the sending side (i.e., traffic may be regularly flowing on the inbound side while the transmit side has no bandwidth).

According to one algorithm designed to prevent this situation, when the amount of credits that are waiting to be returned to the sending side have reached a threshold amount, a timer is started in which the outbound side will enter the L0 (or, alternatively, L0p) state if no transaction or other need to use the outbound direction naturally arises (i.e., no packet is presented in either of queues 331, 332 for transport over the logical link that the returned credits can piggy back on). After reaching the L0 (or L0p) state, a control packet is then sent containing the credits that have stockpiled in the port circuit. Here, not shown in FIG. 3, is a counter that measures the number of credits waiting to be returned to the sending side. The state machine 301 has one or more inputs that indicate the value of this counter, and, the state machine 301 monitors these inputs in the L1 or L0s state. The state machine also has (or receives input from an associated) timer that indicates when the critical time period for triggering entry into a non-zero bandwidth state has elapsed.

Returning to FIG. 4b, an embodiment of the state machine 301 operates as follows. According to one embodiment, the state machine 301 receives input signals from circuitry associated with one or more of the outbound queues (e.g., outbound queue 318 and/or both outbound queues 331, 332) that periodically determines the amount of data waiting to be transported and the average amount of data waiting to be transported between the sampling times. When the average amount of data falls below some critical threshold (e.g., within a range of 10 to 20% of the outbound direction's maximum bandwidth when all links are on (the L0 state)) over a period of time, the state machine 301 transitions 410 the port circuit into the L0p state 406.

While in the L0p state 406, the average amount of data waiting to be transported is still monitored, and, if it rises above some critical threshold (e.g., within a range of 60 to 80% of the outbound direction's maximum bandwidth when all links are on (the L0 state)) over a period of time (Tb) in which bandwidth is computed, the L0 state is re-entered 411. Note that the threshold associated with transition 411 (L0p to L0) should be higher than the threshold of transition 410 (L0 to L0p) so that some form of hysteresis is built into the transitions between these two states. Recall that the L0p state may have multiple sub states that may be entered through different thresholds, where, each state has a corresponding outbound bandwidth. Specifically, a lower bandwidth sub-state is continually entered into as the average amount of data waiting to be transported continues to fall beneath lower and lower thresholds.

A transition 412 from the L0p state 406 to the L0s state 407 can be triggered if the average amount of data waiting to be transported falls to zero and remains there for a specific period of time (Ti). According to one approach, the time of inactivity is greater than the time period over which the average amount of data waiting to be transported is measured (in other words, Ti>Tb). A transition 413 from the L0s state to the L0 state (or, alternatively, transition 417 to the L0p state) occurs if one of the outbound channel queues 331, 332 receives a packet for outbound transmission. As such, the state machine receives input signals from circuitry associated with these queues 331, 332 that monitor their state and the amount of data they represent/contain. Transitioning from L0s based on the reception of a packet improves performance by minimizing the latency to reads (assuming that a read packet was received) whereas transitions from L0p to a high bandwidth state may use a bandwidth threshold metric. In systems where performance may not be as important as power savings (such as a mobile system), bandwidth metrics may be used to transition even from the L0s state. That is, in a desktop system, where higher performance is likely to be more important, transition 413 may be utilized to minimize latency. In a mobile system, where the amount of power consumed is likely to be more important, transitions 413 and 411 (to go from L0s from L0p and L0) may be utilized. While in state L0s, the transition utilized may also be based on the transaction type of the arriving packet. For example, utilizing transition 413 for demand transactions to minimize latency and transition 417 for transactions where latency is not critical (for example, the latency associated with prefetch transactions is generally not critical).

A transition 415 into the L1 state occurs if the L0s state is maintained for a pre-determined time period. As such, the state machine maintains (or accepts input signals from) a timer that measures this time period. Transitions 418 and 416 from the L1 stat may use similar conditions as the transitions from L0s. For example, the conditions that apply to 413 and/or 417 may apply to transitions 418 and 416.

Of course, other state machines only using a portion of the state machine described in FIG. 4b may be utilized that employ the above described transitional techniques. For example, state machines utilizing just L0; L0 and L0s; L0 and L0p; or L0, L0s, and L0p; etc. may be used. Additionally, the state machine used for inbound and outbound traffic may be different.

Using L0s for inbound transactions typically provides the best power to performance tradeoff. L0p and L0p in combination with L0s does not quite have the same beneficial tradeoff (although the combination of L0s and L0p is better than L0p alone). For outbound transactions, the combination of L0p and L0s provides the best power to performance tradeoff. Additionally, the benefits of using L0s versus L0p, etc. differ based on the number of processing cores in the system.

The state machine 301 may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. An apparatus comprising:
a processor core;
an interface implemented in hardware, the interface comprising physical layer circuitry, wherein the interface is to couple the apparatus to a memory over a particular link, the particular link comprises a plurality of physical lanes, and the plurality of physical lanes comprises one or more lanes in a transmit direction and one or more lanes in a receive direction; and
wherein the physical layer circuitry is to support a plurality of defined link states in a state machine, and the physical layer circuitry is to power down a subset of lanes in the plurality of lanes to adjust the number of active lanes in the particular link in association with entry into a particular one of the plurality of link states.

2. The apparatus of claim 1, further comprising a network of physical links, wherein the network of physical links comprises a plurality of links, and the plurality of links comprises the particular link.

3. The apparatus of claim 2, wherein the network of physical links interconnects a plurality of components of a computing system.

4. The apparatus of claim 3, wherein the network of physical links connects to at least one network component.

5. The apparatus of claim 1, further comprising a throughput detector executable by the processor core to identify throughput needs of the particular link, wherein the physical layer circuitry is to power down a subset of lanes in the plurality of lanes based on the identified throughput needs.

6. The apparatus of claim 1, wherein the particular link comprises a point-to-point link.

7. The apparatus of claim 1, further comprising a queue for data to be transmitted over the particular link.

8. The apparatus of claim 7, wherein identifying the throughput needs comprises determining a depth of the queue.

9. The apparatus of claim 7, wherein the queue comprises a transmit queue.

10. The apparatus of claim 1, further comprising a clock, wherein the clock is to remain operational during the powering down of the subset of lanes.

11. The apparatus of claim 1, wherein the subset of lanes are to be powered down in association with a transition from an active link state in the plurality of link states to the particular link state in the plurality of link states.

12. An apparatus comprising:
an interface comprising physical layer circuitry, wherein the interface is to couple the apparatus to a memory over a particular link, the particular link comprises a plurality of physical lanes, and the plurality of physical lanes comprises one or more lanes in a transmit direction and one or more lanes in a receive direction; and
circuitry to control link states associated with the particular link, wherein the link states are defined in a state machine, the link states comprise an active link state and a lower power active link state, the plurality of lanes are to be used in the active link state, and the physical layer circuitry is to power down a subset of lanes in the plurality of lanes to adjust the number of active lanes in the particular link in association with a transition from the active link state to the lower power active link state.

13. The apparatus of claim 12, further comprising a network of physical links, wherein the network of physical links comprises a plurality of links, and the plurality of links comprises the particular link.

14. The apparatus of claim 13, wherein the network of physical links interconnects a plurality of components of a computing system.

15. The apparatus of claim 14, wherein the network of physical links connects to at least one network component.

16. The apparatus of claim 12, further comprising circuitry to identify throughput needs of the particular link, wherein the physical layer circuitry is to power down a subset of lanes in the plurality of lanes transition from the active link state to the lower power active link state based on the identified throughput needs.

17. A method comprising:
   detecting an event associated with a point-to-point link comprising a plurality of physical lanes, wherein the link connects a processor core to a memory, and the link is one of a plurality of links in a network of point-to-point links interconnecting a plurality of components in a computing system, wherein the plurality of components comprise the processor core;
   sending a control signal to cause a transition from a first link state in a state machine to a second link state in the state machine based on detecting that power usage is to be reduced on the link;
   powering down a subset of the plurality of lanes to reduce width of the link to reduce power consumption of the link based on the event, wherein the plurality of lanes are defined to be used in the first link state and the subset of lanes are to be powered down in the second link state; and
   communicating data over the link in the second link state while the subset of lanes are powered down.

18. The method of claim 17, wherein the event comprises a change in throughput needs of the link.

19. The method of claim 18, wherein detecting the change in throughput needs comprises monitoring status of queue for queuing data to be sent over the link.

20. A system comprising:
   a memory; and
   a processor device to couple to the memory, wherein a particular link is used to couple the memory, the particular link comprises a plurality of physical lanes, and the plurality of physical lanes comprises one or more lanes in a transmit direction and one or more lanes in a receive direction, wherein the processor device comprises:
      an interface comprising a physical layer circuitry;
      wherein the physical layer circuitry is to support a plurality of defined link states in a state machine, and the physical layer circuitry is to power down a subset of the plurality lanes of the particular link to adjust the number of active lanes in the particular link in association with entry into a particular one of the plurality of link states.

21. The system of claim 20, wherein the processor device further comprises a throughput detector executable by the processor core to identify throughput needs of the particular link, wherein the physical layer is to power down a subset of the plurality lanes of the particular link based on the throughput needs.

22. The system of claim 20, further comprising a network of physical links, wherein the network of physical links comprises a plurality of links, and the plurality of links comprises the particular link.

23. The system of claim 22, wherein the network of physical links interconnects a plurality of components of a computing system.

24. The system of claim 23, wherein the network of physical links connects to at least one network component.

25. The system of claim 20, wherein the particular link state comprises a partial active link state.

26. The system of claim 20, wherein the system comprises a multi-processor system and the processor device is one of a plurality of processor devices in the system.

* * * * *